United States Patent Office 2,805,137
Patented Sept. 3, 1957

2,805,137
METHOD AND COMPOSITION FOR CONDITIONING CUT FLOWERS

John R. Clopton, Boulder, Colo.

No Drawing. Application December 27, 1955,
Serial No. 555,234

28 Claims. (Cl. 71—2.4)

This invention relates to the conditioning of cut flowers, leaves, branches and other portions of plants and refers more particularly to a method and composition for the conditioning of cut flowers, leaves, branches, and other portions of plants.

When flowers, leaves, branches, and other portions of plants are cut from the plants, they rapidly lose their fresh appearance and soon wilt and die. The short period during which cut flowers, leaves, branches, and other portions of plants, particularly cut flowers, retain their fresh appearance, is of particular concern from an economic standpoint to commercial flower growers and to florists. Because of their short life, cut flowers must be quickly shipped by the grower after cutting to the florist for sale to the consumer. Further, the shelf life of the flowers in the hands of the florist is short. Accordingly, it becomes difficult or impossible for the grower and florist to retain cut flowers for more than a few days before they must be sold to the consumer or lose their sale value. The time before which cut flowers and other portions of plants begin to wilt and die may be extended by keeping them under refrigeration or by placing their stems in water or by both. It has been proposed to achieve a further extension by conditioning the cut flowers and other portions of plants by adding various preservatives or preservative compositions to the water in which their stems are placed. However, while preservatives and preservative compositions extend the life of the cut flowers and other portions of plants, the preservatives and preservative compositions heretofore employed have left much to be desired from the standpoint of the time during which the flowers have remained fresh. Further, conditioning of cut flowers and other portions of plants with these preservatives and preservative compositions has left much to be desired from the standpoint of dyeing cut flowers and other portions of plants.

It is an object of this invention to provide a method and composition for conditioning cut flowers, leaves, branches, and other portions of plants. It is another object of this invention to extend the life of cut flowers and other portions of plants. It is another object of this invention to dye cut flowers and other portions of plants. It is another object of this invention to improve the appearance of cut flowers and other portions of plants. These and other objects of the invention will become apparent from the following detailed description thereof.

In accordance with the invention, there is provided a composition comprising a phenol, a compound selected from the group consisting of carbonyl-containing compounds and compounds capable of being catabolized by plant enzymes to a carbonyl-containing compound and which are utilizable by cut flowers and other portions of plants as an energy source, and a compound selected from the group consisting of hydrazines, amines, and quaternary ammonium compounds, which composition is added to water to form a solution thereof in which the stems of cut flowers and other portions of plants are immersed.

The phenol employed in the composition may be a compound having at least one hydroxyl group attached directly to a benzene ring. The phenol may be a monohydric phenol, a dihydric phenol or a trihydric phenol. Further, the phenol may be substituted, i. e., the benzene ring may contain another group or other groups in addition to the hydroxyl group. Among the monohydric phenols that may be employed in the composition are hydroxybenzene, hydroxyquinoline, ortho nitrophenol, para nitrophenol, 2,4-dinitrophenol, 2,6-dinitrophenol, ortho aminophenol, para aminophenol, and meta aminophenol. Among the dihydric phenols that may be employed are catechol, resorcinol, hydroquinone, and orcinol. Among the trihydric phenols that may be employed are pyrogallol, phloroglucinol, and gallic acid. Of the various phenols, 8-hydroxyquinoline, hydroquinone, phloroglucinol, resorcinol, and hydroxybenzene are preferred in view of their superior effects. Generally, 8-hydroxyquinoline is to be preferred to hydroquinone, phloroglucinol, resorcinol, and hydroxybenzene.

While the phenols, and their solutions in sufficiently high concentration, have antiseptic properties, they are ineffective as antiseptics in solutions of low concentration. As will be set forth hereinafter in greater detail, the amount of the phenol in the composition and the amount of the composition added to the water to make up the solution in which the stems of the cut flowers are immersed are low, and in the concentrations employed the phenol exhibits slight if any antiseptic effect. The phenol accordingly does not function in the composition as an antiseptic but rather functions, as I have discovered, as a respiratory inhibitor, i. e., as an agent to slow down the action of the respiratory enzymes of the plant.

The second ingredient of the composition, as stated, is a compound selected from the group consisting of carbonyl-containing compounds and compounds capable of being catabolized by plant enzymes to a carbonyl-containing compound and which are utilizable by cut flowers and other portions of plants as an energy source. Cut flowers and other portions of plants utilize as a source of energy carbonyl-containing compounds such as glyceraldehyde and dihydroxyacetone. The cut flowers and other portions of the plant contain enzymes which catabolize various compounds to carbonyl-containing compounds such as glyceraldehyde and dihydroxyacetone. Among the compounds capable of being catabolized by plant enzymes and which may be employed as the second ingredient of the composition are the monosaccharides such as glucose, mannose, galactose, fructose, and sorbose, the disaccharides such as sucrose, maltose, and lactose, monohydric alcohols such as ethanol, and polyhydric alcohols such as glycerol, mannitol, and sorbitol. The carbonyl-containing compounds which may be employed as the second ingredient of the composition are glyceraldehyde, dihydroxyacetone, and acetaldehyde. Where alcohols or glyceraldehyde, dihydroxyacetone, or acetaldehyde are employed, it is preferred to employ also a monosaccharide or disaccharide in admixture therewith. Of the various compounds that may be employed as the second ingredient, sucrose is preferred.

The third ingredient of the composition is a compound selected from the group consisting of hydrazine, amines, and quaternary ammonium compounds. These compounds must also have antiseptic properties, the property of lowering the surface tension of water, and the ability to provide nitrogen utilizable as a plant nutrient. The amines may be monoamines or diamines. Suitable monoamines include methyl amine, ethyl amine, propyl amine, butyl amine, amyl amine, etc. Suitable diamines include diamino methane, ethylene diamine, trimethylene diamine, putrescine, cadaverine, etc. The amines may also be polyamines such as triamino methane, propylene diamine, tetramethylene-tetramine, hexamethylene-tetramine, etc. Of the quaternary ammonium compounds, any quaternary ammonium compound having antiseptic properties, the property of lowering the surface tension of water, and the ability to provide nitrogen utilizable as a plant nutrient may be employed in the composition. The quaternary ammonium compounds may be of diverse classes. The classes listed below are typical:

1. Salts of polymethylenetetramines
2. Alkylammonium salts represented by the formula:

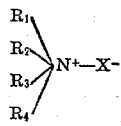

where at least one of $R_1$, $R_2$, $R_3$, and $R_4$ is an alkyl group, the remainder of $R_1$, $R_2$, $R_3$, and $R_4$ are hydrogen or alkyl groups and $X^-$ is a halogen, sulphate, acetate, or other suitable anion.

3. Alkylpyridinium salts represented by the formula:

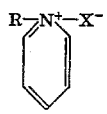

where R is hydrogen or an alkyl group and $X^-$ is a halogen, sulphate, acetate, or other suitable anion. Various substituents may replace the hydrogens attached to the carbons in the ring. Included in this class of compounds are various pyridine-3-sulfonamides, nicotinamides, etc.

4. Salts containing an ether linkage and represented by the formula:

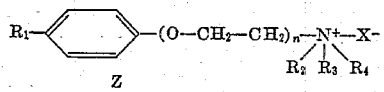

where $R_1$ is an alkyl, aryl, aralkyl, or cycloalkyl group, Z may be a halogen or an alkyl, aryl, aralkyl, or cycloalkyl group, $R_2$, $R_3$, and $R_4$ may be hydrogen, a methyl group, or a substituted methyl group, and $n$ is a whole number. Particular compounds in this group are:

(a)

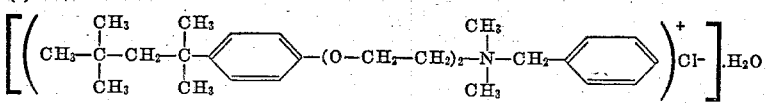

di-isobutyl phenoxy ethoxy ethyl dimethyl benzyl ammonium chloride, monohydrate, and (b)

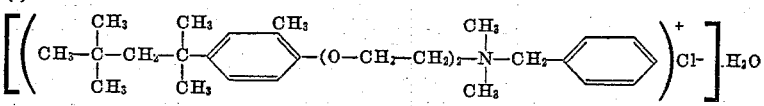

di-isobutyl cresoxy ethoxy ethyl dimethyl benzyl ammonium chloride, monohydrate.

5. Salts containing an amide or ester linkage, such as:

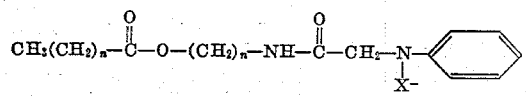

6. Salts containing an unsaturated long chain alkyl group, such as:

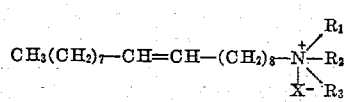

where $R_1$, $R_2$, or $R_3$ is hydrogen or an alkyl, aryl, aralkyl, or cycloalkyl group, and $X^-$ is a halide, sulphate, acetate, or other suitable anion.

7. Salts containing an aromatic nucleus having the hydrogen or a carbon in the ring substituted by another group, such as:

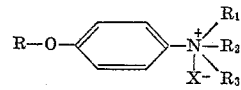

or

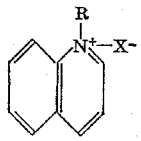

where R is $C_{12}H_{25}$, $R_1$, $R_2$ or $R_3$ is hydrogen or an alkyl, aryl, aralkyl, or cycloalkyl group, and $X^-$ is a halide, sulphate, acetate, or other suitable anion.

8. Salts of sulfonamides, such as:

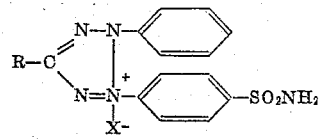

where R is hydrogen or an alkyl, aryl, aralkyl, or cycloalkyl group and $X^-$ is a halide, sulfate, acetate, or other suitable anion.

Hydrazine may be employed in the composition in the form of a salt such as the sulfate, etc.

Of the compounds selected from the group consisting of hydrazines, amines, and quaternary ammonium compounds, it is preferred to employ hydrazine sulfate, di-isobutyl phenoxy ethoxy ethyl dimethyl benzyl ammonium chloride, or di-isobutyl cresoxy ethoxy ethyl dimethyl benzyl ammonium chloride.

The composition should contain the constituents in the following proportions by weight: (a) phenol—5 to 1200 parts, (b) compound selected from the group consisting of carbonyl-containing compounds and compounds capable of being catabolized by plant enzymes to a carbonyl-containing compound—5,000 to 50,000 parts, and (c) compound selected from the group consisting of hydrazines, amines, and quaternary ammonium compounds—10 to 900 parts. Preferably, the composition should contain the constituents in the proportions by weight as follows: (a) phenol—25 to 500 parts, (b) compound selected from the group consisting of carbonyl-containing compounds and compounds capable of being catabolized by plant enzymes to a carbonyl-containing compound—15,000 to 25,000 parts, and (c) compound selected from the group consisting of hydrazines, amines, and quaternary ammonium compounds—10 to 400 parts. Within these ranges, however, the particular proportion of each constituent giving the best results will vary depending upon the particular specific constituents employed.

Where a hydrazine or amine is employed, improved results are obtained by employing along with the hydrazine or amine a nonionic or anionic surface active agent. These surface active agents are compounds that may be represented as consisting of two parts: one part made up of a hydrocarbon chain that is oil soluble and virtually water insoluble and the other made up of a strongly water soluble group which renders the molecule water soluble. The nonionic surface active agents are electrically neutral in solution, i. e., they do not ionize. The anionic surface active agents ionize in solution and the hydrocarbon portion of the molecule bears the negative charge. Nonionic surface active agents that may be employed include the aryl, alkyl, aralkyl, and alkaryl ethers of polyoxyethylene and polyoxypropylene. Typical compounds include polyoxyethylene ethers of lauryl alcohol containing between about 4 and 23 moles of ethylene oxide and polyoxyethylene and polyoxypropylene glucose tetraoleate. Mixed polyoxyethylene and polyoxypropylene ethers may also be employed. Other nonionic surface active agents that may be employed include polyglycol esters, sorbitan sesquioleate, and propylene glycol monostearate. Anionic surface active agents that may be employed include the aryl sulfonic acids and the alkyl substituted aryl sulfonic acids. Typical compounds include alkyl benzene sulfonates such as benzene sulfonate having one of the hydrogen atoms on the benzene ring substituted by an alkyl chain containing from six to twelve carbon atoms. Other anionic surface active agents that may be employed include di-isopropyl naphthalene sulfonate. Where sulfonates are employed, it is preferred to employ in addition thereto an inorganic salt having a buffering action to maintain a solution of the sulfonate on the acid side. Sodium sulfate has been found to be effective.

Where a nonionic or anionic surface active agent is employed, the amount thereof may be the same as given above for the hydrazines and amines. However, the particular amount of any surface active agent giving the best results will vary depending upon the specific surface active agent and the specific other constituents in the composition.

It is not essential that only one phenol, only one compound selected from the group consisting of carbonyl-containing compounds and compounds capable of being catabolized by plant enzymes to a carbonyl-containing compound, and only one compound selected from the group consisting of hydrazines, amines, and quaternary ammonium compounds be employed in the composition. It is possible, and in some instances preferable, to employ in the composition two or more phenols, or two or more compounds selected from the group consisting of carbonyl-containing compounds and compounds capable of being catabolized by plant enzymes to a carbonyl-containing compound, or two or more compounds selected from the group consisting of hydrazines, amines, and quaternary ammonium compounds. For example, where glycerine is employed as a compound which is capable of being catabolized by plant enzymes to a carbonyl-containing compound, it is preferred to employ another compound of the same class, such as sucrose, in admixture with it. Further, for example, a mixture of hydrazine sulfate and di-isobutyl phenoxy ethoxy ethyl dimethyl benzyl ammonium chloride, monohydrate, is particularly effective. Any combination of one or two or more specific compounds in each of the three classes of constituents may be employed in the composition, and where two or more specific compounds in any one of the three classes of constituents are employed, the combined weights of the two or more specific compounds in each class should be within the ranges given above for the relative proportions of each class.

Similarly, two or more nonionic or anionic surface active agents may be employed where such agents are employed along with a hydrazine or an amine. Nonionic or anionic surface active agents may be employed along with each, if desired. The combined weights of two or more surface active agents that may be employed should be within the range given above for the surface active agents.

The composition may be prepared as a dry powder by selection of such specific compounds in each of the three classes of constituents entering into the composition that the mixture thereof is in the solid phase. Thus, for example, a composition containing phloroglucinol, sucrose, and di-isobutyl phenoxy ethoxy ethyl dimethyl benzyl ammonium chloride, monohydrate, is in the solid phase. Where the composition is in the solid phase, the solid can be added to the water in which the stems of the cut flowers or other portions of plants are immersed. However, where the composition is in the solid phase, the solid can be admixed with water, if desired, to form a relatively concentrated solution, and the relatively concentrated solution can be added to the water in which the stems of the cut flowers or other portions of the plants are placed. On the other hand, specific compounds in one or more of the three classes of constituents may be selected so that the composition is in the liquid phase. Additionally, selection of specific compounds in one or more of the three classes of constituents may be made such that the constituents can be maintained in admixture with each other only where the composition is in solution. For example, where the specific compounds selected from the group consisting of hydrazines, amines, and quaternary ammonium salts is a low boiling compound such as methyl amine, the methyl amine is most conveniently maintained in admixture with the other constituents of the composition by dissolving the methyl amine in water in which the other constituents have been or will be dissolved. Where a nonionic or anionic surface active agent is employed along with a hydrazine or an amine, the specific agent or agents may be selected in conjunction with the other specific constituents of the composition so that the mixture is in the solid phase or in the liquid phase.

The composition, it will be seen from the above, can be in the form of a solid or in the form of a liquid. From the standpoint of reduction of bulk, ease of handling, convenience in packaging, and economy in shipping, it is preferred to make up the composition in the form of a solid, such as a powder or a tablet. On the other hand, where the composition is in the form of a powder, there is danger that gravity segregation of the constituents may occur with the result that upon admixture of a portion of the composition with the water to which the stems of the cut flowers or other portions of the plant are immersed, the water will not contain the constituents of the composition in the proper proportions for effective conditioning of the cut flowers or other portions of the plant. Where the composition is in the form of a liquid, whether of an aqueous solution or otherwise, segregation of the constituents either will not occur or, as in the case of a suspension, can be easily corrected by simple shaking or stirring and, therefore, from this standpoint, the composition in the form of a liquid is to be preferred to the composition in the form of a powdered solid.

The composition may contain other materials which may be effective from the standpoint of conditioning cut flowers or otherwise desirable. For example, the composition may contain magnesium sulfate or manganese sulfate or both. Where these latter compounds are employed, in a composition containing by weight 5 to 1200 parts of phenol, 5,000 to 50,000 parts of compound selected from the group consisting of carbonyl-containing compounds and compounds capable of being catabolized by plant enzymes to a carbonyl-containing compound, and 10 to 900 parts of compound selected from the group consisting of hydrazines, amines, and quaternary ammonium compounds, the amount of magnesium sulfate may be between 400 and 1,000, but preferably 800, parts and the amount of manganese sulfate may be between 200 and 800, but preferably 400, parts.

For the conditioning of cut flowers, leaves, branches or other portions of plants, the stems thereof are immersed in water containing the composition comprising a phenol, a compound selected from the group consisting of carbonyl-containing compounds and compounds capable of being catabolized by plant enzymes to a carbonyl-containing compound utilizable by cut flowers and other portions of plants as an energy source, and a compound selected from the group consisting of hydrazines, amines, and quaternary ammonium compounds. Generally, satisfactory results are obtained where the concentration of the composition in the solution is between about 0.5 and 5.0 percent by weight. However, higher and lower concentrations may be employed, if desired. In practice, it is preferred to first dissolve the composition in water in the concentration desired and then immerse the stems of the cut flowers therein. After immersing the stems in the water containing the composition dissolved therein, the stems are thereafter maintained in the solution until the plant tissue has absorbed some of the solution. The stems may then be placed in plain water. However, the cut flowers or other portions of plants may be maintained in the solution until they have served their purpose and are discarded or until they die.

The compositions given in the following table have been found to be particularly effective. In the table, the constituents of each composition are given in the first column, the range of proportions of the constituents in parts by weight that have been found to be satisfactory are given in the second column, and the preferred proportions of the constituents in parts by weight are given in the third column.

Table

| | Constituents | Range of Proportions | Preferred Proportions |
|---|---|---|---|
| A | Hydroquinone | 5 to 1,000 | 50 |
| | Sucrose | 5,000 to 50,000 | 20,000 |
| | Di-isobutyl phenoxy ethoxy ethyl dimethyl benzyl ammonium chloride, monohydrate. | 10 to 400 | 100 |
| B | Phloroglucinol | 5 to 600 | 50 |
| | Sucrose | 5,000 to 50,000 | 20,000 |
| | Di-isobutyl phenoxy ethoxy ethyl dimethyl benzyl ammonium chloride, monohydrate. | 10 to 400 | 200 |
| C | Phloroglucinol | 5 to 1,200 | 200 |
| | Sucrose | 5,000 to 50,000 | 20,000 |
| | Hydrazine sulfate | 10 to 500 | 200 |
| D | Resorcinol | 5 to 1,000 | 200 |
| | Sucrose | 5,000 to 50,000 | 20,000 |
| | Hydrazine sulfate | 10 to 500 | 200 |
| E | Resorcinol | 5 to 1,000 | 200 |
| | Sucrose | 5,000 to 50,000 | 20,000 |
| | Hydrazine sulfate | 10 to 500 | 200 |
| | Di-isobutyl phenoxy ethoxy ethyl dimethyl benzyl ammonium chloride, monohydrate. | 10 to 400 | 200 |
| F | 8-Hydroxyquinoline sulfate | 5 to 1,000 | 70 |
| | Sucrose | 5,000 to 50,000 | 20,000 |
| | Hydrazine sulfate | 10 to 500 | 200 |
| | Benzene sulfonate having one of the hydrogen atoms on the benzene ring substituted by an alkyl chain containing from six to twelve carbon atoms. | 10 to 500 | 100 |
| G | Hydroxybenzene | 5 to 1,200 | 200 |
| | Sucrose | 5,000 to 50,000 | 20,000 |
| | Di-isobutyl phenoxy ethoxy ethyl dimethyl benzyl ammonium chloride, monohydrate. | 10 to 400 | 200 |

While the conditioning method and composition of the invention is of particular value from the standpoint of preserving cut flowers and other portions of plants, it is also of value from the standpoint of facilitating the penetration and absorption of dyes into the petals of cut flowers. Cut flowers are commonly dyed by immersing their stems in solutions of various water soluble dyes whereby the dye is carried upward through the stem to the flower petals. As a result, the petals are enhanced in color or changed to another color. The various dyes differ in chemical structure and in affinity for various portions of the plant tissue, which differences give rise to differences in rate of uptake and distribution of the dyes within the flower tissues. For any given dye, however, the degree of dehydration of the cut flower or other portion of the plant and the humidity of the atmosphere surrounding the cut flower or other portion of the plant affect the rate of uptake and distribution of the dye. I have found that a significantly better penetration and a more uniform distribution of dye are effected where the dye solution in which the stems of the cut flowers are immersed contains therein the composition comprising a phenol, a compound selected from the group consisting of carbonyl-containing compounds and compounds capable of being catabolized by plant enzymes to a carbonyl-containing compound, and a compound selected from the group consisting of hydrazine, amines, and quaternary ammonium compounds.

In dyeing cut flowers in accordance with this aspect of the invention, the appropriate amount of dye, which may be between about one and eighty grams per gallon of water depending upon the particular dye and the extent of dyeing desired, as is well known in the art, is dissolved in water which may be heated, as, for example, to about 180° F. After the dye is dissolved, the solution is cooled, as, for example, to about 120° F. and the composition comprising a phenol, a compound selected from the group consisting of carbonyl-containing compounds and compounds capable of being catabolized by plant enzymes to a carbonyl-containing compound, and a compound selected from the group consisting of hydrazine, amines, and quaternary ammonium compounds is added to and dissolved in the dye solution. The amount of the composition to be employed is the same as given above, i. e., between about 0.5 and 5 percent by weight of the solution. If the solution has been heated, it is allowed to cool further and the flowers are placed with the cut ends of their stems immersed in the solution until the petals have attained a desired tint, then removed and placed with the stems in water or preferably in water containing dissolved therein the composition of the invention.

Any type of the dye heretofore employed for dyeing cut flowers may be employed. These dyes may be, for example, acid dyes, basic dyes, substantive dyes, food dyes, or other types of water soluble dyes. Suitable dyes include Patent blue, Orange A, Orange I, Bright orange, Brilliant green, Victoria green, Ultramarine blue, Methylene blue 2B, Indigo-carmin, Navy blue, Azure blue, Yellow SP, Nacco yellow, Neopolitan yellow, Congo red, Erie 4B, Perfect red, Rhodamine "S," Amaranth, Erythrosine, Light green SF, Naphthol yellow S, Orange I, Tartrazine, and Ponceau 3R.

The examples following will be illustrative of the invention.

In each of the examples, the stems of a group of cut flowers were immersed and maintained in 600 cubic centimeters of water as a control or in 600 cubic centimeters of aqueous solution of the composition of the invention. Unless otherwise indicated each group contained eight flowers. Each of the 600 cubic centimeters of water or aqueous solution were contained in a glass receptacle fitted at the mouth thereof with a water repellant collar to hold the stems in an upright position and keep them from contacting the glass of the mouth of the receptacle. The stem of each flower was cut to the same length, namely sixteen inches, and, in the case of carnations, the cuts were always between the nodes of the stem. The flowers were maintained at a temperature between 70 and 75° F., although no attempt was made to control the humidity of the atmosphere surrounding the flowers. The time in days during which each flower in the group remained alive was measured and the total number of flower days, i. e., the sum of the days each flower in each group remained alive, was noted. For the purpose of the examples, the flowers were considered to be no longer alive when the petals began to curl, or, in the case of roses, when the petals began to fall. The tables for each example give the number of groups of flowers conditioned, the composition of the aqueous solution, the number of days during which each flower remained alive, and the total number of flower days for each group. In each table, the flowers in group I were conditioned with plain water as the control.

EXAMPLE 1

In this example, five groups of white carnations were conditioned. Groups 2 to 5 were conditioned with aqueous solution containing phloroglucinol in different concentrations, sucrose, and di-isobutyl phenoxy ethoxy ethyl dimethyl benzyl ammonium chloride, monohydrate.

Table

| Group No | 1 | 2 | 3 | 4 | 5 |
|---|---|---|---|---|---|
| Composition of Solution: | | | | | |
| Phloroglucinol, p. p. m | | 50 | 100 | 150 | 250 |
| Sucrose, p. p. m | | 20,000 | 20,000 | 20,000 | 20,000 |
| Di-isobutyl, etc., p. p. m | | 50 | 50 | 50 | 50 |
| Number of Days Each Flower Lived: | | | | | |
| 1st Flower | 7 | 13 | 13 | 12 | 12 |
| 2nd Flower | 7 | 13 | 13 | 12 | 13 |
| 3rd Flower | 8 | 13 | 13 | 12 | 14 |
| 4th Flower | 8 | 13 | 13 | 12 | 15 |
| 5th Flower | 8 | 15 | 13 | 15 | 15 |
| 6th Flower | 8 | 15 | 14 | 16 | 16 |
| 7th Flower | 8 | 16 | 14 | 16 | 16 |
| 8th Flower | 8 | 17 | 15 | 17 | 17 |
| Number of Flower Days | 62 | 115 | 108 | 112 | 118 |

EXAMPLE 2

In this example, four groups of pink carnations were conditioned. Groups 2 to 4 were conditioned with aqueous solution containing phloroglucinol in different concentrations, sucrose, and hydrazine sulfate in different concentrations.

Table

| Group No | 1 | 2 | 3 | 4 |
|---|---|---|---|---|
| Composition of Solution: | | | | |
| Phloroglucinol, p. p. m | | 50 | 100 | 200 |
| Sucrose, p. p. m | | 20,000 | 20,000 | 20,000 |
| Hydrazine sulfate, p. p. m | | 200 | 200 | 200 |
| Number of Days Each Flower Lived: | | | | |
| 1st Flower | 6 | 13 | 12 | 15 |
| 2nd Flower | 7 | 13 | 12 | 17 |
| 3rd Flower | 7 | 13 | 12 | 17 |
| 4th Flower | 7 | 13 | 16 | 17 |
| 5th Flower | 8 | 15 | 18 | 17 |
| 6th Flower | 8 | 15 | 20 | 18 |
| 7th Flower | 8 | 17 | 20 | 18 |
| 8th Flower | 9 | 18 | 21 | 21 |
| Number of Flower Days | 60 | 117 | 131 | 140 |

EXAMPLE 3

In this example, five groups of white carnations were conditioned. Groups 2 to 5 were conditioned with aqueous solution containing resorcinol in different concentrations, sucrose, and di-isobutyl phenoxy ethoxy ethyl dimethyl benzyl ammonium chloride, monohydrate, in different concentrations.

Table

| Group No | 1 | 2 | 3 | 4 | 5 |
|---|---|---|---|---|---|
| Composition of Solution: | | | | | |
| Resorcinol, p. p. m | | 25 | 50 | 200 | 250 |
| Sucrose, p. p. m | | 20,000 | 20,000 | 20,000 | 20,000 |
| Di-isobutyl, etc., p. p. m | | 200 | 200 | 200 | 200 |
| Number of Days Each Flower Lived: | | | | | |
| 1st Flower | 6 | 11 | 11 | 13 | 14 |
| 2nd Flower | 6 | 12 | 12 | 13 | 15 |
| 3rd Flower | 6 | 12 | 12 | 14 | 15 |
| 4th Flower | 6 | 13 | 14 | 14 | 16 |
| 5th Flower | 7 | 13 | 15 | 16 | 17 |
| 6th Flower | 7 | 14 | 17 | 16 | 17 |
| 7th Flower | 7 | 15 | 17 | 17 | 17 |
| 8th Flower | 8 | 17 | 19 | 18 | 17 |
| Number of Flower Days | 53 | 107 | 117 | 121 | 128 |

EXAMPLE 4

In this example, two groups of red roses were conditioned, the second group being conditioned with aqueous solution containing phloroglucinol, sucrose, and hydrazine sulfate.

Table

| Group No | 1 | 2 |
|---|---|---|
| Composition of Solution: | | |
| Phloroglucinol, p. p. m | | 200 |
| Sucrose, p. p. m | | 20,000 |
| Hydrazine sulfate, p. p. m | | 200 |
| Number of Days Each Flower Lived: | | |
| 1st Flower | 1 | 6 |
| 2nd Flower | 1 | 6 |
| 3rd Flower | 2 | 6 |
| 4th Flower | 2 | 6 |
| 5th Flower | 2 | 6 |
| 6th Flower | 3 | 6 |
| 7th Flower | 3 | 7 |
| 8th Flower | 3 | 7 |
| Number of Flower Days | 17 | 50 |

EXAMPLE 5

In this example, four groups of white carnations were conditioned. Groups 2 to 4 were conditioned with aqueous solution containing hydroquinone in different concentrations, sucrose, and di-isobutyl phenoxy ethoxy ethyl dimethyl benzyl ammonium chloride, monohydrate.

Table

| Group No. | 1 | 2 | 3 | 4 |
|---|---|---|---|---|
| Composition of Solution: | | | | |
| Hydroquinone, p. p. m | | 25 | 50 | 75 |
| Sucrose, p. p. m | | 20,000 | 20,000 | 20,000 |
| Di-isobutyl, etc., p. p. m | | 250 | 250 | 250 |
| Number of Days Each Flower Lived: | | | | |
| 1st Flower | 6 | 11 | 11 | 9 |
| 2nd Flower | 6 | 14 | 13 | 12 |
| 3rd Flower | 6 | 14 | 14 | 13 |
| 4th Flower | 6 | 15 | 14 | 13 |
| 5th Flower | 6 | 15 | 16 | 15 |
| 6th Flower | 6 | 15 | 16 | 15 |
| 7th Flower | 6 | 16 | 17 | 17 |
| 8th Flower | 6 | 18 | 18 | 17 |
| Number of Flower Days | 48 | 118 | 119 | 111 |

EXAMPLE 6

In this example, five groups of white carnations were conditioned, the flowers in groups 2 to 4 being conditioned with aqueous solution containing phloroglucinol, sucrose in different concentrations, and hydrazine sulfate in different concentrations.

Table

| Group No | 1 | 2 | 3 | 4 | 5 |
|---|---|---|---|---|---|
| Composition of Solution: | | | | | |
| Phloroglucinol, p. p. m | | 200 | 200 | 200 | 200 |
| Sucrose, p. p. m | | 20,000 | 20,000 | 30,000 | 35,000 |
| Hydrazine Sulfate, p. p. m | | 100 | 200 | 200 | 200 |
| Number of Days Each Flower Lived: | | | | | |
| 1st Flower | 8 | 15 | 12 | 16 | 14 |
| 2nd Flower | 8 | 17 | 15 | 17 | 16 |
| 3rd Flower | 8 | 18 | 16 | 17 | 16 |
| 4th Flower | 9 | 19 | 16 | 17 | 16 |
| 5th Flower | 10 | 19 | 17 | 17 | 17 |
| 6th Flower | 10 | 19 | 19 | 17 | 17 |
| 7th Flower | 10 | 20 | 20 | 18 | 18 |
| 8th Flower | 11 | 20 | 22 | 18 | 20 |
| Number of Flower Days | 74 | 147 | 137 | 137 | 134 |

EXAMPLE 7

In this example, five groups of pink carnations were conditioned, groups 2 to 5 being conditioned with aqueous solution containing resorcinol in different concentrations, sucrose, and hydrazine sulfate.

Table

| Group No. | 1 | 2 | 3 | 4 | 5 |
|---|---|---|---|---|---|
| Composition of Solution: | | | | | |
| Resorcinol, p. p. m. | | 50 | 100 | 150 | 250 |
| Sucrose, p. p. m. | | 20,000 | 20,000 | 20,000 | 20,000 |
| Hydrazine Sulfate, p. p. m. | | 200 | 200 | 200 | 200 |
| Number of Days Each Flower Lived: | | | | | |
| 1st Flower | 6 | 15 | 15 | 17 | 15 |
| 2nd Flower | 7 | 15 | 15 | 17 | 21 |
| 3rd Flower | 7 | 17 | 15 | 18 | 23 |
| 4th Flower | 7 | 20 | 17 | 20 | 23 |
| 5th Flower | 7 | 21 | 22 | 20 | 24 |
| 6th Flower | 7 | 21 | 23 | 21 | 24 |
| 7th Flower | 8 | 23 | 24 | 23 | 24 |
| 8th Flower | 8 | 24 | 24 | 24 | 24 |
| Number of Flower Days | 57 | 156 | 155 | 160 | 178 |

EXAMPLE 8

In this example, three groups of red carnations were conditioned, groups 2 and 3 being conditioned with aqueous solution containing resorcinol in different concentrations, sucrose, and hydrazine sulfate.

Table

| Group No. | 1 | 2 | 3 |
|---|---|---|---|
| Composition of Solution: | | | |
| Resorcinol, p. p. m. | | 100 | 200 |
| Sucrose, p. p. m. | | 20,000 | 20,000 |
| Hydrazine sulfate, p. p. m. | | 200 | 200 |
| Number of Days Each Flower Lived: | | | |
| 1st Flower | 7 | 15 | 18 |
| 2nd Flower | 7 | 16 | 18 |
| 3rd Flower | 8 | 16 | 18 |
| 4th Flower | 8 | 17 | 18 |
| 5th Flower | 9 | 18 | 19 |
| 6th Flower | 9 | 18 | 19 |
| 7th Flower | 9 | 18 | 19 |
| 8th Flower | 9 | 20 | 20 |
| Number of Flower Days | 66 | 138 | 149 |

EXAMPLE 9

In this example, two groups each of eight different varieties of carnations were conditioned, the second group of each of the eight different varieties being conditioned with aqueous solution containing 200 p. p. m. resorcinol, 20,000 p. p. m. of sucrose, 200 p. p. m. of di-isobutyl phenoxy ethoxy ethyl dimethyl benzyl ammonium chloride, monohydrate, and 200 p. p. m. of hydrazine sulfate.

EXAMPLE 10

In this example, two groups of white carnations were conditioned, the second group being conditioned with aqueous solution containing 8-hydroxyquinoline sulfate, sucrose, and hydrazine sulfate.

Table

| Group No. | 1 | 2 |
|---|---|---|
| Composition of Solution: | | |
| 8-Hydroxyquinoline sulfate, p. p. m. | | 70 |
| Sucrose, p. p. m. | | 20,000 |
| Hydrazine sulfate, p. p. m. | | 200 |
| Number of Days Each Flower Lived: | | |
| 1st Flower | 6 | 7 |
| 2nd Flower | 6 | 9 |
| 3rd Flower | 7 | 11 |
| 4th Flower | 8 | 12 |
| 5th Flower | 8 | 16 |
| 6th Flower | 9 | 17 |
| 7th Flower | 9 | 19 |
| 8th Flower | 9 | 20 |
| Number of Flower Days | 62 | 111 |

EXAMPLE 11

In this example, two groups of pink roses were conditioned, the second group being conditioned with aqueous solution containing 8-hydroxyquinoline sulfate, sucrose, and hydrazine sulfate.

Table

| Group No. | 1 | 2 |
|---|---|---|
| Composition of Solution: | | |
| 8-Hydroxyquinoline sulfate, p. p. m. | | 70 |
| Sucrose, p. p. m. | | 20,000 |
| Hydrazine sulfate, p. p. m. | | 200 |
| Number of Days Each Flower Lived: | | |
| 1st Flower | 3 | 9 |
| 2nd Flower | 4 | 9 |
| 3rd Flower | 4 | 11 |
| 4th Flower | 5 | 11 |
| 5th Flower | 5 | 11 |
| 6th Flower | 6 | 12 |
| 7th Flower | 6 | 12 |
| 8th Flower | 6 | 13 |
| Number of Flower Days | 39 | 88 |

EXAMPLE 12

In this example, two groups of six pink roses each were conditioned, the second group being conditioned with aqueous solution containing 8-hydroxyquinoline sul-

Table

| Variety | White Sims | | Red Sims | | Pink Sims | | Weirich's Peppermint | | Miller's Yellow | | Phyllis G. | | Apollo | | Scarlet King | |
|---|---|---|---|---|---|---|---|---|---|---|---|---|---|---|---|---|
| Group No. | 1 | 2 | 1 | 2 | 1 | 2 | 1 | 2 | 1 | 2 | 1 | 2 | 1 | 2 | 1 | 2 |
| No. of Days, Each Flower Lived: | | | | | | | | | | | | | | | | |
| 1st Flower | 6 | 17 | 5 | 15 | 6 | 15 | 7 | 16 | 7 | 10 | 6 | 15 | 5 | 9 | 7 | 16 |
| 2nd Flower | 6 | 18 | 6 | 16 | 6 | 18 | 7 | 16 | 7 | 18 | 7 | 15 | 5 | 13 | 9 | 18 |
| 3rd Flower | 6 | 18 | 7 | 17 | 7 | 19 | 7 | 16 | 8 | 19 | 7 | 16 | 6 | 14 | 9 | 19 |
| 4th Flower | 7 | 18 | 7 | 18 | 7 | 19 | 7 | 16 | 8 | 19 | 7 | 16 | 6 | 14 | 10 | 20 |
| 5th Flower | 7 | 18 | 7 | 18 | 7 | 19 | 7 | 17 | 8 | 19 | 7 | 17 | 6 | 15 | 10 | 20 |
| 6th Flower | 7 | 18 | 7 | 19 | 7 | 20 | 7 | 17 | 8 | 19 | 7 | 17 | 6 | 16 | 10 | 21 |
| 7th Flower | 7 | 19 | 7 | 19 | 7 | 21 | 7 | 18 | 9 | 19 | 8 | 17 | 6 | 17 | 11 | 21 |
| 8th Flower | 9 | 19 | 8 | 20 | 8 | 22 | 8 | 18 | 9 | 20 | 8 | 18 | 7 | 18 | 11 | 21 |
| No. of Flower Days | 55 | 145 | 54 | 142 | 55 | 153 | 57 | 134 | 64 | 143 | 56 | 131 | 47 | 116 | 77 | 156 | fate, glucose, hydrazine sulfate, and benzene sulfonate having one of the hydrogen atoms on the benzene ring substituted by alkyl chains having six to twelve carbon atoms.

Table

| Group No | 1 | 2 |
|---|---|---|
| Composition of Solution: | | |
| 8-Hydroxyquinoline sulfate, p. p. m | | 70 |
| Glucose, p. p. m | | 20,000 |
| Hydrazine sulfate, p. p. m | | 200 |
| Benzene sulfonate, etc., p. p. m | | 100 |
| Number of Days Each Flower Lived: | | |
| 1st Flower | 4 | 8 |
| 2nd Flower | 5 | 9 |
| 3rd Flower | 5 | 10 |
| 4th Flower | 5 | 11 |
| 5th Flower | 6 | 12 |
| 6th Flower | 6 | 13 |
| Number of Flower Days | 31 | 63 |

EXAMPLE 13

In this example, two groups of six white carnations each were conditioned, the second group being conditioned with aqueous solution containing 8-hydroxyquinoline sulfate, sucrose, hydrazine sulfate, and a mixed polyoxyethylene and polypropylene alkyl ether sold commercially as Pluronic F68.

Table

| Group No | 1 | 2 |
|---|---|---|
| Composition of Solution: | | |
| 8-Hydroxyquinoline sulfate, p. p. m | | 70 |
| Sucrose, p. p. m | | 20,000 |
| Hydrazine sulfate, p. p. m | | 200 |
| Mixed ether, p. p. m | | 100 |
| Number of Days Each Flower Lived: | | |
| 1st Flower | 6 | 15 |
| 2nd Flower | 7 | 15 |
| 3rd Flower | 7 | 16 |
| 4th Flower | 7 | 16 |
| 5th Flower | 8 | 18 |
| 6th Flower | 8 | 19 |
| Number of Flower Days | 43 | 99 |

EXAMPLE 14

In this example, two groups of white carnations were dyed. The carnations of the first group were dyed by immersing their stems in an aqueous solution containing 3,000 p. p. m. of Patent blue while the carnations of the second group were dyed by immersing their stems in an aqueous solution containing 50 p. p. m. of hydroquinone, 20,000 p. p. m. of sucrose, 100 p. p. m. of di-isobutyl phenoxy ethoxy ethyl dimethyl ammonium chloride, monohydrate, and 3,000 p. p. m. of Patent blue. Both groups of flowers were permitted to remain in the respective solutions for a period of twelve hours.

The carnations whose stems were immersed in the aqueous solution containing only the Patent blue did not take the dye uniformly. The petals at the periphery of the bloom contained large accumulations of the dye at their outer edges with little or not dye accumulating in the petals inwardly from the outer edges. Additionally, the petals at the center portion of the bloom were devoid of dye. On the other hand, with the second group of carnations the dye settled more uniformly with respect to the entire surface of the petals and settled more uniformly with respect to the petals at the periphery of the bloom and at the center portion of the bloom. Further, the blooms in the second group remained alive for a number of flower days equal to three and one-half times the number of flower days for the first group.

Having thus described my invention, it will be understood that such description has been given by way of illustration and example and not by way of limitation, reference for the latter purpose being had to the appended claims.

This application is a continuation-in-part of my co-pending application, Serial Number 375,286, filed August 19, 1953 (now abandoned).

I claim:

1. A composition for the conditioning of cut flowers, leaves, branches, and other portions of plants comprising a phenol, a compound selected from the group consisting of carbonyl-containing compounds and compounds capable of being catabolized by plant enzymes to a carbonyl-containing compound, and a compound selected from the group consisting of hydrazines, amines, and quarternary ammonium compounds.

2. A composition for the conditioning of cut flowers, leaves, branches, and other portions of plants comprising 5 to 1,200 parts by weight of a phenol, 5,000 to 50,000 parts by weight of a compound selected from the group consisting of carbonyl-containing compounds and compounds capable of being catabolized by plant enzymes to a carbonyl-containing compound, and 10 to 900 parts by weight of a compound selected from the group consisting of hydrazines, amines, and quarternary ammonium compounds.

3. The composition of claim 2 wherein the phenol is hydroquinone.

4. The composition of claim 2 wherein the phenol is phloroglucinol.

5. The composition of claim 2 wherein the phenol is resorcinol.

6. The composition of claim 2 wherein the phenol is hydroxyquinoline.

7. The composition of claim 2 wherein the phenol is hydroxybenzene.

8. The composition of claim 2 wherein the compound selected from the group consisting of carbonyl-containing compounds and compounds capable of being catabolized by plant enzymes to a carbonyl-containing compound is sucrose.

9. The composition of claim 2 wherein the compound selected from the group consisting of hydrazines, amines, and quarternary ammonium compounds is hydrazine sulfate.

10. The composition of claim 2 wherein the compound selected from the group consisting of hydrazines, amines, and quaternary ammonium compounds is di-isobutyl phenoxy ethoxy ethyl dimethyl benzyl ammonium chloride, monohydrate.

11. The composition of claim 2 wherein the compound selected from the group consisting of hydrazine, amines, and quaternary ammonium compounds is di-isobutyl cresoxy ethoxy ethyl dimethyl benzyl ammonium chloride, monohydrate.

12. A composition for the conditioning of cut flowers, leaves, branches, and other portions of plants comprising 5 to 1,200 parts by weight of a phenol, 5,000 to 50,000 parts by weight of a compound selected from the group consisting of carbonyl-containing compounds and compounds capable of being catabolized by plant enzymes to a carbonyl-containing compound, and 10 to 900 parts by weight of a hydrazine.

13. A composition for the conditioning of cut flowers, leaves, branches, and other portions of plants comprising 5 to 1,200 parts by weight of a phenol, 5,000 to 50,000 parts by weight of a compound selected from the group consisting of carbonyl-containing compounds and compounds capable of being catabolized by plant enzymes to a carbonyl-containing compound, and 10 to 900 parts by weight of an amine.

14. A composition for the conditioning of cut flowers, leaves, branches, and other portions of plants comprising 5 to 1,200 parts by weight of a phenol, 5,000 to 50,000 parts by weight of a compound selected from the group consisting of carbonyl-containing compounds and compounds capable of being catabolized by plant enzymes to a carbonyl-containing compound, 10 to 900 parts by weight of a hydrazine, and a compound selected from the group consisting of the nonionic and anionic surface active agents.

15. The composition of claim 14 wherein the compound selected from the group consisting of the nonionic and anionic surface agents is benzene sulfonate having one of the hydrogen atoms on the benzene ring substituted by an alkyl chain containing from six to twelve carbon atoms.

16. A composition for the conditioning of cut flowers, leaves, branches, and other portions of plants comprising 25 to 500 parts by weight of a phenol, 15,000 to 25,000 parts by weight of a compound selected from the group consisting of carbonyl-containing compounds and compounds capable of being catabolized by plant enzymes to a carbonyl-containing compound, and 10 to 400 parts by weight of a compound selected from the group consisting of hydrazines, amines, and quaternary ammonium compounds.

17. A composition for the conditioning of cut flowers, leaves, branches, and other portions of plants comprising 5 to 1,000 parts by weight of hydroquinone, 5,000 to 50,000 parts by weight of sucrose, and 10 to 400 parts by weight of di-isobutyl phenoxy ethoxy ethyl dimethyl benzyl ammonium chloride, monohydrate.

18. A composition for the conditioning of cut flowers, leaves, branches, and other portions of plants comprising 5 to 600 parts by weight of phloroglucinol, 5,000 to 50,000 parts by weight of sucrose, and 10 to 400 parts by weight of di-isobutyl phenoxy ethoxy ethyl dimethyl benzyl ammonum chloride, monohydrate.

19. A composition for the conditioning of cut flowers, leaves, branches, and other portions of plants comprising 5 to 1,200 parts by weight of phloroglucinol, 5,000 to 50,000 parts by weight of sucrose, and 10 to 500 parts by weight of hydrazine sulfate.

20. A composition for the conditioning of cut flowers, leaves, branches, and other portions of plants comprising 5 to 1,000 parts by weight of resorcinol, 5,000 to 50,000 parts by weight of sucrose, and 10 to 500 parts by weight of hydrazine sulfate.

21. A composition for the conditioning of cut flowers, leaves, branches, and other portions of plants comprising 5 to 1,000 parts by weight of resorcinol, 5,000 to 50,000 parts by weight of sucrose, 10 to 500 parts by weight of hydrazine sulfate, and 10 to 400 parts by weight of di-isobutyl phenoxy ethoxy ethyl dimethyl benzyl ammonium chloride, monohydrate.

22. A composition for the conditioning of cut flowers, leaves, branches, and other portions of plants comprising 5 to 1,000 parts by weight of resorcinol, 5,000 to 50,000 parts by weight of sucrose, and 10 to 400 parts by weight of di-isobutyl phenoxy ethoxy ethyl dimethyl benzyl ammonium chloride, monohydrate.

23. A method for the conditioning of cut flowers, leaves, branches, and other portions of plants comprising immersing the cut stems thereof in an aqueous solution containing a phenol, a compound selected from the group consisting of carbonyl-containing compounds and compounds capable of being catabolized by plant enzymes to a carbonyl-containing compound, a compound selected from the group consisting of hydrazines, amines, and quaternary ammonium compounds, and a water soluble dye.

24. A composition for the conditioning of cut flowers, leaves, branches, and other portions of plants comprising 5 to 1,200 parts by weight of 8-hydroxyquinoline sulfate, 5,000 to 50,000 parts by weight of sucrose, 10 to 900 parts by weight of hydrazine sulfate, and 10 to 900 parts by weight of benzene sulfonate having one of the hydrogen atoms on the benzene ring substituted by an alkyl chain containing from six to twelve carbon atoms.

25. A composition for the conditioning of cut flowers, leaves, branches, and other portions of plants comprising a phenol, a compound selected from the group consisting of carbonyl-containing compounds and compounds capable of being catabolized by plant enzymes to a carbonyl-containing compound, a compound selected from the group consisting of hydrazines, amines, and quaternary ammonium compounds, and a water soluble dye.

26. A method for the conditioning of cut flowers, leaves, branches, and other portions of plants, comprising immersing the cut stems thereof in an aqueous solution containing a phenol, a compound selected from the group consisting of carbonyl-containing compounds and compounds capable of being catabolized by plant enzymes to a carbonyl-containing compound, and a compound selected from the group consisting of hydrazines, amines, and quaternary ammonium compounds.

27. The method of claim 26 wherein the phenol, the compound selected from the group consisting of carbonyl-containing compounds and compounds capable of being catabolized by plant enzymes to a carbonyl-containing compound, and the compound selected from the group consisting of hydrazines, amines, and quaternary ammonium compounds are in the ratio to each other in parts by weight of 5 to 1,200, 5,000 to 50,000 and 10 to 900, respectively.

28. The method of claim 26 wherein the phenol, the compound selected from the group consisting of carbonyl-containing compounds and compounds capable of being catabolized by plant enzymes to a carbonyl-containing compound, and the compound selected from the group consisting of hydrazines, amines, and quaternary ammonium compounds are in the ratio to each other in parts by weight of 25 to 500, 15,000 to 25,000 and 10 to 400, respectively.

No references cited.